L. A. CASGRAIN.
SPEED GAGE.
APPLICATION FILED JUNE 18, 1909.
1,042,890.
Patented Oct. 29, 1912.
3 SHEETS—SHEET 1.
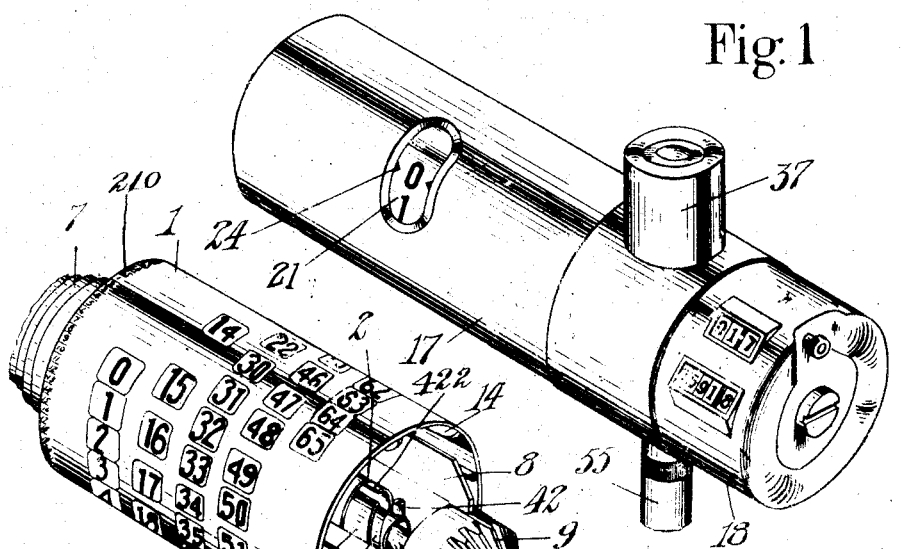
Fig. 1
Fig. 3.
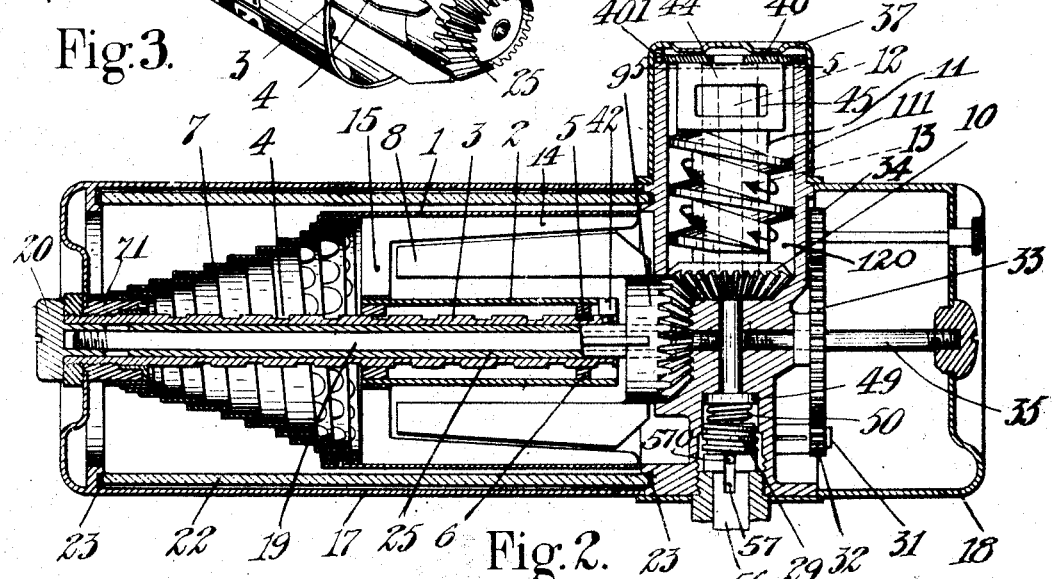
Fig. 2.
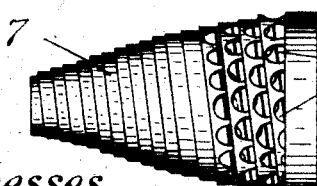
Fig. 4.
Fig. 5.
Witnesses.
A. C. Richardson.
R. A. Simonds.
Inventor.
Louis A. Casgrain
by his Attorneys
Phillips, Van Ornum & Fish L. A. CASGRAIN.
SPEED GAGE.
APPLICATION FILED JUNE 18, 1909.
1,042,890.
Patented Oct. 29, 1912.
3 SHEETS—SHEET 2.
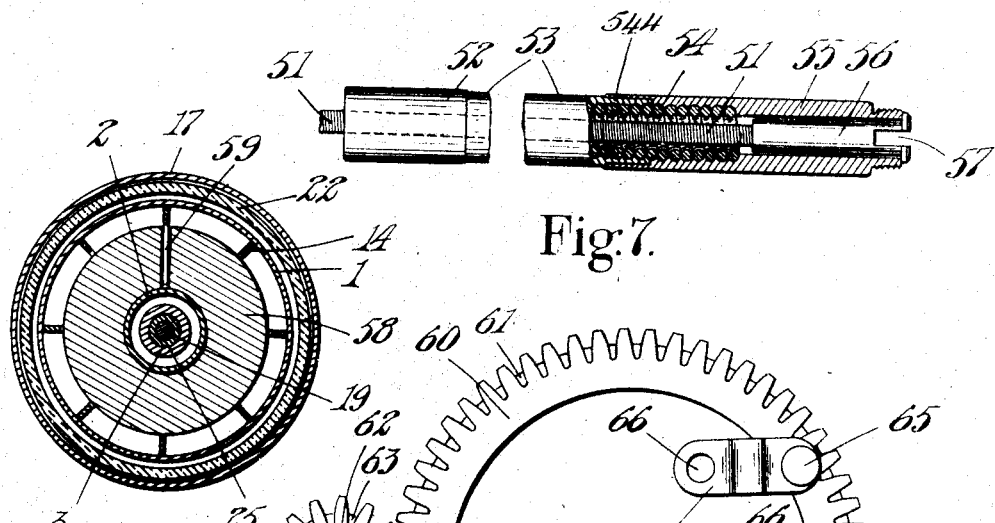
Fig. 7.
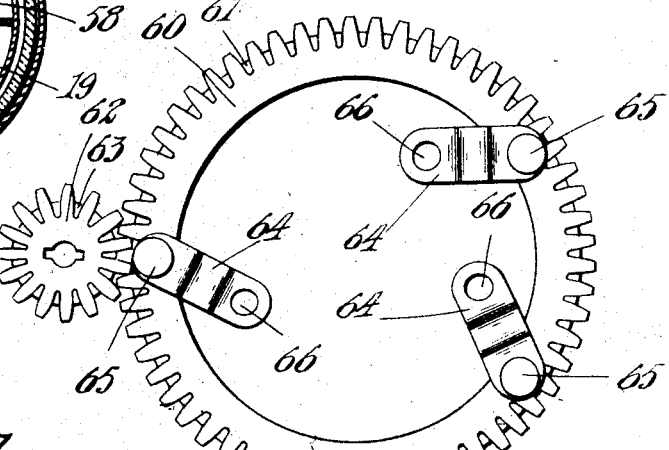
Fig. 6.
Fig. 8.
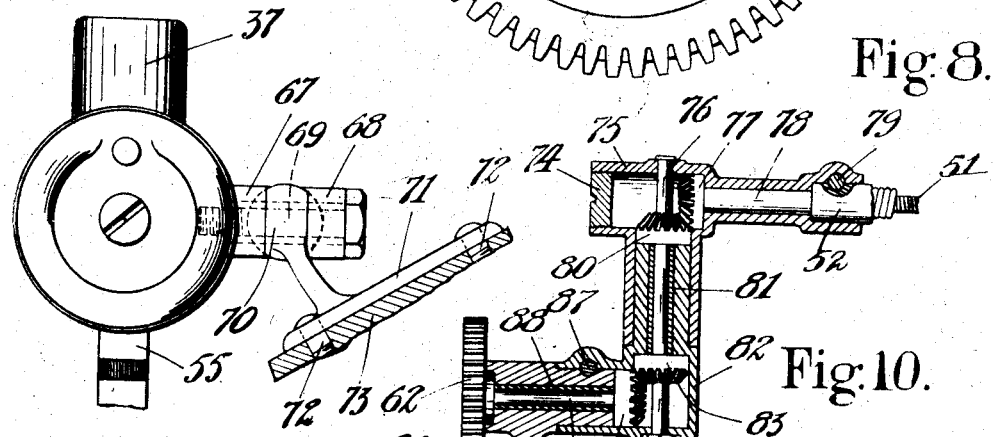
Fig. 9.
Fig. 10.
Witnesses
A. C. Richardson
R. A. Simonds
Inventor
Louis A. Casgrain
by his attorneys
Phillips, Van Emert & Fish L. A. CASGRAIN.
SPEED GAGE.
APPLICATION FILED JUNE 18, 1909.
1,042,890.
Patented Oct. 29, 1912.
3 SHEETS—SHEET 3.
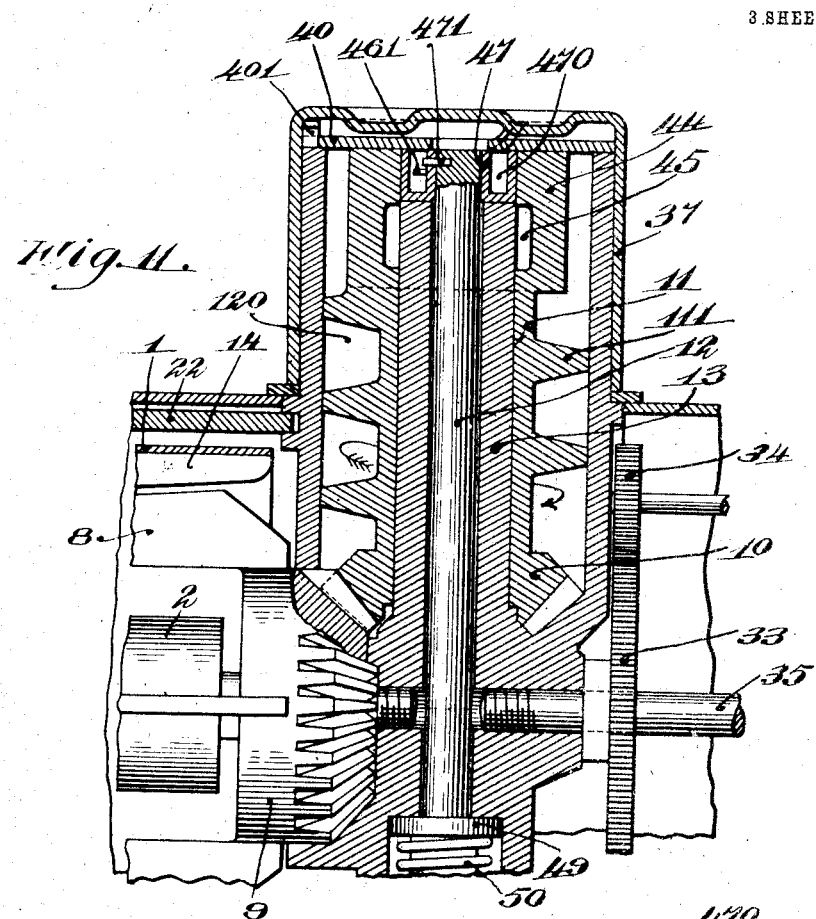
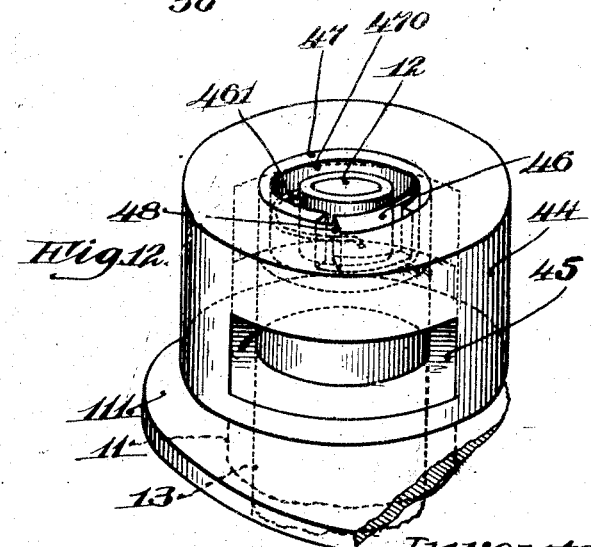
Witnesses
A. C. Richardson
R. A. Simonds
Inventor
Louis A. Casgrain
by his attorneys

UNITED STATES PATENT OFFICE.

LOUIS A. CASGRAIN, OF BEVERLY, MASSACHUSETTS.

SPEED-GAGE.

1,042,890.  Specification of Letters Patent.  Patented Oct. 29, 1912.

Application filed June 18, 1909. Serial No. 502,875.

*To all whom it may concern:*

Be it known that I, LOUIS A. CASGRAIN, a citizen of the United States, residing at Beverly, in the county of Essex and State of Massachusetts, have invented certain new and useful Improvements in Speed-Gages; and I do hereby declare the following to be a full, clear, and exact description of the invention, such as will enable others skilled in the art to which it appertains to make and use the same.

The present invention relates to speed gages, and more particularly to speed gages adapted for use on automobiles and similar vehicles.

The purpose of the present invention is to improve, in certain particulars which will be hereinafter more specifically referred to, the speed gage forming the subject-matter of my Patent No. 962,622, granted June 28, 1910, and with this object in view the present invention consists in the devices and combinations of devices hereinafter described and more particularly defined in the claims.

In the accompanying drawings which illustrate what is now considered the preferred embodiment of the present invention, Figure 1 shows in oblique perspective the speed gage assembled; Fig. 2 is a vertical medial section of the same; Fig. 3 is an oblique perspective of the indicating cylinder of the gage and a portion of its actuating mechanism; Fig. 4 is an elevation of the coiled spring against the tension of which the indicating cylinder is rotated; Fig. 5 is a horizontal section on line 5—5, Fig. 2; Fig. 6 is a transverse vertical section of a modification of the gage; Fig. 7 shows partly in elevation and partly in section, the construction of flexible shaft for actuating the gage from one of the road wheels of the vehicle or automobile; Fig. 8 is a side elevation of the gears by means of which the shaft is driven, showing the clips for attaching the large or driving gear to the hub of the wheel of the vehicle; Fig. 9 illustrates a method of mounting the gage upon an automobile; Fig. 10 is a view, mostly in vertical section, showing the swiveling connections between the driving gears and the flexible shaft; Fig. 11 is an enlarged vertical sectional view of a portion of the actuating mechanism contained in the gage proper; Fig. 12 is an enlarged perspective of a portion of said mechanism; and Fig. 13 is a sectional view through the intermeshing teeth of the driving gears showing the cutting away or beveling of the bottom of the spaces between the teeth to enable the gears to force out laterally any dust or dirt that may tend to collect between them.

The speed gage which constitutes the subject-matter of the present invention, like that shown in my patent above referred to, is of that type or class in which one member is turned against a yielding resistance by means of the drag exerted by a rotating member actuated by the object of which the speed is to be indicated. Such drag may be created magnetically, or by a fluid, or in any other suitable manner. In the drawings of the present application, as well as in those of the prior patent, the gage is shown as designed to operate with a fluid, although a modification is illustrated in one figure in which magnetism is employed.

The speed gage shown in the accompanying drawings, like that disclosed in my prior patent, comprises an indicating cylinder 1 which is mounted to turn upon and move longitudinally along the fixed sleeve 3 by means of the pin or roll 5 projecting from the collar 6 rigidly secured to the hub or sleeve 2 upon which the cylinder is rigidly mounted, said pin 5 engaging the helical groove 4 formed on the outer surface of the fixed sleeve 3. The indicating cylinder 1 is adapted to be moved against the resistance of the flat coiled spring 7, one end of which is secured to the cylinder, while the other end is attached to a fixed sleeve 71 upon the sleeve 3. This spring, it will be noted, operates as a closed spring, that is rotation of the indicating cylinder against the spring, acts to open or uncoil the same. In this respect the gage of the present application differs essentially from that shown and described in my prior patent, in which the spring acts as an open spring, being coiled or wound up when the cylinder is rotated by the positively driven member. The use of a closed spring in place of an open spring is a feature of considerable importance, since it renders the instrument much more sensitive and accurate, due, it is believed, to the fact that there is little if any sliding of the adjacent convolutions of the spring upon each other, as probably is the case where the spring is coiled instead of uncoiled when the cylinder is turned against the resistance thereof. This spring further differs from the spring shown in my prior patent in that a number of the larger or outer convolutions are provided with a series of holes 41 punched therein, thus removing a portion of the body of the spring and rendering these convolutions more flexible and sensitive than other portions of the spring. This affords a very convenient and simple manner of providing a spring of variable tension or resistance in different portions of its length without varying the outer dimensions thereof.

The indicating cylinder 1 is rotated, generally speaking in the same manner as is shown and described in my patent above referred to, an actuating fluid such as kerosene or any other suitable liquid being provided which normally submerges the cylinder 1 and fills the lower portion of chamber 120 and which is driven around within the gage by means of vanes 8 on the gear 9 which is rigidly mounted upon the sleeve 25 free to turn upon the fixed rod 19 centrally supported in the gage, all as shown in said patent. The mechanism for actuating gear 9 differs, however, in some respects, from that shown in said patent, and comprises a gear 10 rigidly fixed upon or integral with the sleeve 11 rotatably mounted upon the vertical fixed bearing sleeve 13 and driven from the vertical shaft 12 by suitable pawl and ratchet mechanism, said shaft in turn being driven by the flexible shaft, one end of which is connected with one of the wheels of the vehicle, all as will be more fully set forth hereinafter.

As described in my patent the indicating cylinder 1 is provided on its interior with longitudinal baffles 14 formed integral with the radiating arms 15, by means of which the cylinder is supported upon the sleeve 2. When the vehicle is in motion the blades or vanes 8 are driven at a speed proportionate to the speed of the vehicle, and cause the actuating fluid to rotate within the gage with a force also proportionate to the speed. The rotating fluid as it impinges upon the baffles on the cylinder drags the latter around with it until the force exerted by the fluid is just balanced by the resistance of the spring, when the cylinder comes to rest where it will remain until a variation in the speed of the vehicle either increases or diminishes the force exerted by the fluid, and advances the cylinder still further or allows it to rotate backward under the force of the spring.

The indicating characters or graduations in the present form of gage, just as in the case of my patent, are arranged in a helix upon the exterior surface of the indicating cylinder and are adapted to be brought beneath the window 21 in the wall of the gage and opposite the pointers or marks 24 to indicate the speed of the vehicle at any given instant. By providing the casing member 17 with the glass cylinder 22 which is clamped tightly between the packing rings 23 at each end by means of the screw 20, the escape of the actuating fluid through the window is prevented.

In the gage of my prior patent the indicating characters or graduations were applied to the surface of the indicating cylinder at regular and predetermined distances apart along a helix, the tension or force of the spring at various portions of its length being subsequently varied or adjusted so that the proper character would be brought opposite the pointers throughout the entire range of the instrument. In the present form of speed gage, however, this difficult adjustment of the spring has been avoided, and instead the gage has been driven first at one known speed and then at another throughout the entire range of the instrument, readings being taken from the series of figures 210 previously inscribed upon the cylinder so that the indicating characters or graduations may subsequently be marked upon the cylinder at the proper points to bring each character exactly opposite the pointers when the vehicle attains the speed indicated by that character. As a result, the characters as shown in Fig. 3 are spaced at irregular and varying distances apart along the helix, but since only a small number of characters are ever visible at one and the same time through the window, such variation in spacing is unobjectionable.

In order to prevent the accidental rotation of the indicating cylinder in a backward direction beyond the zero point of the instrument, a stop has been provided in the form of the screw 42 secured in the fixed sleeve 3 and adapted to be engaged by the shoulder 422 on the sleeve 2 of the cylinder.

In the speed gage of my patent the actuating fluid had a tendency to work out and escape around the vertical shaft of the gage which was driven by the flexible shaft. This was probably due to the working up of the fluid between the integral sleeve and gear on such shaft and the fixed bearing upon which they turned. In the gage of the present application this tendency of the fluid to escape has been overcome by the following changes in this portion of the mechanism. The sleeve carrying the gear 10, instead of having a plain cylindrical surface as in my patent, is provided at its lower portion with a helical rib 111, which, during the forward rotation of the vehicle turns in the direction of the arrow (see Fig. 2), thus continuously forcing downwardly the fluid in the lower portion of chamber 120 within which the sleeve turns. The upper portion of the sleeve is provided with an enlarged cylindrical portion 44 having the aperture 45 somewhat larger transversely than the diameter of the bearing sleeve 13 upon which the sleeve is mounted. This aperture serves to interrupt the continuity of the bearing surface of the rotating sleeve 11 on the fixed bearing sleeve 13 so that the oil or fluid which is worked and carried upward between the rotating and fixed sleeves will have no tendency to rise higher, but instead will flow on to the surface 444 forming the bottom of the aperture 45 and under the centrifugal action due to the rotation of the sleeve will finally be discharged from the outer edges of said bottom surface on to the walls of the chamber, finally flowing under the action of gravity within the field of action of the helical rib 111 and being returned to the main body of oil or fluid in the gage.

In order to prevent rotation of the sleeve 11 in the reverse direction when the vehicle moves backwardly, and thus cause the helical rib 111 to lift the fluid instead of forcing it downwardly, connections have been provided between the vertical shaft 12 and the rotating sleeve 11 whereby the latter will be driven by the former only when the vehicle is moving in a forward direction, the sleeve remaining stationary when the direction of rotation of the shaft 12 is reversed. These connections comprise a collar 47 having the annular groove 470, the collar being secured to the upper end of the shaft 12 by the pin 471. A section of the outer wall of this groove is cut away to receive the pawl 46 which is normally pressed radially outward by the spring 461. A shoulder 48 is provided on the inner wall of the upper end of the rotating sleeve 11, the arrangement of these parts being such that when the shaft 12, and with it the collar 47, are rotated in anti-clockwise direction, viewing the parts as shown in Figs. 5 and 12, by a backward movement of the vehicle, the pawl will simply snap off the shoulder 48 without rotating the sleeve 11. When, however, the shaft 12 is rotated in the opposite direction, the end of the pawl 46 will engage the shoulder 48 and the sleeve 11 will be turned by the shaft 12.

The rotating sleeve 11 is held from endwise movement by means of the washer 40 having the spring prongs or fingers 401 which are engaged by the cap or cover 37 for this portion of the gage, and which is secured to the body of the gage by soldering or in any other suitable manner after the parts are assembled. This washer 40 also prevents the escape of fluid into the upper end of the chamber when the gage is tipped on its side during shipment or at any other time before it is permanently attached in proper position on the vehicle.

The bottom of the collar 47 is held in close engagement with the top surface of the fixed sleeve 13 by means of the spring 50, one end of which engages the washer 49 which surrounds loosely the shaft 12, while the other end engages the worm 29 secured upon said shaft, the close contact of the collar 47 upon the upper end of the fixed sleeve 13 preventing the leakage of the fluid or oil between these parts when the gage is turned upon its side or inverted during shipment or some other time before it is permanently attached in proper position upon the vehicle. It will be noted that the upper portion of chamber 120 provides an expansion space or chamber of sufficient size to permit the expansion of the fluid under all increases of temperature to which it might be subjected without raising the level of the fluid so high that it will escape through the bearing.

The gage of the present application, like that of my patent, is provided with an odometer or a distance recorder. Any convenient form of device may be employed which will be located in a separate compartment of the gage, the indicating characters of which may read through windows in the wall or cover 18. The device is actuated from the worm 29 through suitable gearing such as the gear 32 upon the shaft 31, gear 33 upon the fixed rod 35 and gear 34 meshing therewith, all substantially as shown in my prior patent.

A convenient method of mounting my improved speed gage is shown in Fig. 9 in which two members 67 and 68 are provided with holes through which passes the clamping bolt 69 which screws into the body of the gage. These members are also provided with spherical bearing faces which engage the spherical head 70 of the bracket 71 secured by screws 72 to the inclined foot board 73 of the vehicle, the head 70 having a relatively large hole through which the bolt 69 passes. This form of attachment permits the gage to be mounted in proper vertical position throughout a considerable range of variation in inclination of the foot board of the vehicle. As described in my patent, both portions of the gage, not only the one which carries the speed indicating devices, but also the one which carries the odometer, are adapted to be adjusted to any desired radial position.

In Fig. 6 is shown in vertical transverse section a modified form of gage in which, instead of employing vanes and baffles and an actuating fluid, the indicating cylinder is rotated against the resistance of the yielding spring by the magnetic drag exerted by the magnet rotated in close proximity to bars of suitable material. In this figure the annular magnet 58 with the gap 59 between its poles is rotated positively in close proximity to the iron strips or vanes 14 secured upon the interior of drum 1; the fixed pin or rod 19, the long bearing sleeve 25 for the positively rotating member, the fixed groove sleeve 3, the glass cylinder 22 and the outer metallic casing 17, all are constructed and arranged as heretofore described.

The flexible shaft, which transmits motion from the wheel or other rotating parts of the vehicle to the vertical shaft 12, is formed, as shown in Fig. 7, of spirally wound spring wire 51 which at each end is provided with some convenient means of attachment, such as the cylindrical piece 56, one end of which is secured to the end of the flexible shaft 51 by soldering or in any other convenient manner, while the other end is provided with a slot 57 adapted to receive a driving pin such as the pin 570 fixed in the end of shaft 12 (see Fig. 2). The flexible shaft is inclosed within a flexible casing formed of closely coiled round wire 54 upon which is tightly sewn or otherwise secured a cover of leather or other suitable material. The use of round wire for the casing instead of flat or square wire, as has heretofore been the practice, affords a very simple, neat and efficient means for securing to the ends of the casing of the shaft the brass mountings or fittings by means of which the casing is attached at one end to the gage and at the other to the swiveling connections, shortly to be described. One of these mountings is shown at 55 in Fig. 7 and is screw-threaded on its interior for a portion of its length with the proper size and number of threads. The extreme end of the fitting is preferably counterbored as at 544 to receive the end of the leather cover 53. Before final assembling, the interior of the casing of the flexible shaft will be packed with grease or other suitable lubricant which, by reason of the leather cover and the close fitting brass ends, is prevented from escaping during use.

The flexible shaft for the speed gage is driven, as is commonly the practice with these devices when employed upon automobiles, from one of the front or steering wheels by means of two gears, one fixed upon and rotating with the wheel and the other supported in a bearing rigidly mounted upon the steering arm or knuckle of the wheel. The relatively large gear which is mounted upon the wheel, has heretofore generally been attached by means of special screws or bolts which pass through the body of the gear into the inner end of the hub. Although the holes for these screws or bolts are positioned as accurately as possible, considerable difficulty has been experienced even when the greatest skill and care has been exercised, in mounting this gear exactly concentrically with the hub of the wheel, any eccentricity, however small, resulting in improper meshing of the gears, which not only causes uneven and undue wear upon the teeth of the same, but also render the same objectionably noisy.

Automobile wheels as at present usually constructed have wooden spokes and metallic hubs comprising two or more parts, all rigidly secured together by a plurality of bolts in the end of the hub. Inasmuch as these different parts are made exactly to size so that they are interchangeable, the bolts on any particular hub are very exactly and evenly spaced. This fact has been taken advantage of as affording a simple and convenient method of securing concentric mounting of the gear upon the hub by means of a number of links of exactly the same length pivoted at one end to the body of the gear and having holes at their other ends through which these bolts in the hub of the wheel may be passed. In Fig. 8 the wheel gear is shown in the form of a ring 60 having teeth upon its outer periphery.

The links 64 for attaching the gear to the hub of the wheel are shown as three in number, which are pivoted to the body of the gear at one end by the rivets 65, the holes in the gear for the rivets being drilled at exactly the same distance from the axis of the gear and at either 72° or 144° apart, the gear shown being designed for attachment to a hub having five bolts. In the free end of each link is drilled the hole 66, each at exactly the same distance from its rivet 65. To attach this gear to the hub of the wheel it is only necessary to remove three of the bolts from the hub, turn the links 64 about their pivots until the hole 66 in each of the links registers with one of the holes in the hub, and then reinsert the bolts. Since the links are all of exactly the same length, are pivoted at exactly the same distance from the axis of the gear and at the same angular distance from each other as are the bolts, the gear will necessarily be concentrically mounted upon the hub of the wheel.

If the gear is mounted upon a wheel having six or eight bolts, the links would be attached at an angular distance apart of 60° or 45°, or some multiple thereof, respectively.

If desired, the large gear may be made up with the links attached at the proper angular distances for wheels having a varying number of bolts in their hubs, or the links may be attached at the proper points after purchase and just before attachment, the accurate boring of the holes in the gear for the links being a simple matter compared with the old method of boring a number of holes in both gear and wheel, which not only must be made to register exactly, but which also must bring the gear into exact concentricity with the hub of the wheel.

As already pointed out, the flexible shaft 51 is driven from the gear 60 on the hub of the wheel by means of a second gear connected with said shaft and meshing with said first mentioned gear. Heretofore it has been the general practice to attach this driven gear directly to the flexible shaft and to mount the gear upon the steering arm or knuckle which partakes of all the turning movements of the wheel in steering the vehicle, the flexibility of the driving shaft being relied upon to compensate for such steering movements. This method of actuating the flexible shaft, however, is objectionable, since it puts not only the shaft but the casing as well, under constantly varying strains and stresses, develops excessive friction, and tends to cause undue wear of the parts. These objections have been overcome in the present construction by providing swiveling connections between the driven gear end and the flexible shaft which avoids all strains and pressures due to the steering movements of the wheel from which the speed gage is driven.

As shown in Fig. 10, the small or driven gear 62 is rigidly attached to one end of the shaft 88 provided with the central bore 86 and carrying at its other end the beveled gear 85, said shaft being mounted to turn freely in a bearing in the bracket 89. Adjustably mounted upon the reduced portion concentric with said shaft, and adapted to be secured thereon in desired position by the clamping bolt 87, is the bearing member 82 carrying the hollow shaft 81 upon which are fixed at its lower end the beveled gear 83 meshing with gear 85, and at its upper end the beveled gear 80 meshing with gear 77. Rotatably mounted upon the reduced vertical portion of the bearing member 82 is the L-shaped member 75 secured to said member 82 by the pin or rod 76 passing through the hollow shaft 81 and fastened at its lower end by the nut 84. Rotatably mounted in the horizontal portion of the L-shaped member 75 is the shaft 78, one end of which carries the gear 77, while the other end is attached in any suitable manner to the flexible shaft 51, the fitting 52 on the end of the casing of the shaft being clamped within the enlarged end of such horizontal portion of member 82 by means of the clamping pin 79. The screw plug 74 affords a simple and convenient means for introducing oil or grease or other lubricant for the moving parts.

The bracket 89 which carries the small gear 62 is provided with the arm 90 upon which the clamp 92 is secured by the clamping bolt 91, the clamp in turn being fastened upon the steering arm 94 of the knuckle by means of the clamping members 93 and 95.

From the above description it is apparent that after the bracket 89 has been properly adjusted to bring the small gear into mesh with the large gear 60, the member 82 may be secured in any desired position by means of the adjusting bolt 87. Since the L-shaped member 75 is free to turn upon the bearing member 82, a movement of the steering wheel in one direction or the other as the vehicle is turned upon its course, will result in a corresponding relative movement between the two bearing members 75 and 82 without any appreciable flexing or bending of the flexible shaft 51. All undue strains and friction are thus avoided and the flexure or bending of the flexible shaft is reduced to a minimum and remains substantially constant irrespective of whether the vehicle is proceeding in a straight line or turning sharply in one direction or another.

The driving gears for speed gages and similar devices as at present mounted upon automobiles are entirely exposed and tend to collect mud and dust, particularly between the gear teeth, and unless removed will cause the teeth of one gear to "bottom" in the other gear, resulting in undesirable noise and excessive strain and wear, if not actual breakage, of the parts. This tendency to collect material between the teeth of the gear is avoided in my improved form of speed gage by rendering the gears self cleaning, as it were, so that any material which would ordinarily be packed down in the bottom of the spaces between the adjacent teeth will be forced out sidewise. This is accomplished by cutting away or beveling on one side or the other the bottom of these spaces, as shown at 61 and 63, Figs. 8 and 13.

While my improved speed gage has been described as applied to an automobile, it is apparent that it is equally adaptable for use upon other vehicles, or for indicating the speed of other objects.

Having thus described the present invention, what is claimed is:

1. A speed gage, having, in combination, a fixed member, a movable member arranged to be rotated and to be moved along the axis of rotation, one of said members being provided with a series of graduations to indicate a given range of speeds, and the other of said members being provided with means to indicate the particular graduation corresponding to the speed attained by the object the speed of which is to be indicated, means actuated by the object for exerting a rotative force on the movable member, means for moving said member along the axis of rotation when said member is rotated, and a closed spiral spring having one end secured in fixed position and the other end attached to the movable member, said spring acting in opposition to said rotative force to cause the movable member to be rotated and to be moved along the axis of rotation as the speed of the object varies to cause said members to indicate the speed attained, substantially as described.

2. A speed gage, having, in combination, a fixed member, a movable member comprising an open-ended cylinder, said movable member being arranged to be rotated and to be moved along the axis of rotation, one of said members being provided with a series of graduations to indicate a given range of speeds and the other of said members being provided with means to indicate the particular graduation corresponding to the speed attained by the object the speed of which is to be indicated, means actuated by the object for exerting a rotative force upon the movable member, means for moving said member along the axis of rotation when said member is rotated, and a closed conical spiral spring having one end secured in fixed position and its other end secured within the open end of the cylinder, said spring acting in opposition to said rotative force to cause the movable member to be rotated and to be moved along the axis of rotation as the speed of the object varies to cause said members to indicate the speed attained, substantially as described.

3. A speed gage, having, in combination, a rotatable member, a fixed member, one of said members being provided with a series of graduations to indicate a given range of speeds, and the other of said members being provided with means to indicate the particular graduation corresponding to the speed attained by the object the speed of which is to be indicated, means actuated by the object for exerting a rotative force upon the rotatable member, and a spiral spring provided with a plurality of holes for a portion of its length acting on said rotatable member in opposition to said rotative force to cause the rotatable member to rotate as the speed of the object varies to cause said members to indicate the speed attained, substantially as described.

4. A speed gage, having, in combination, a rotatable member, a fixed member, one of said members being provided with a series of graduations to indicate a given range of speeds, and the other of said members being provided with means to indicate the particular graduation corresponding to the speed attained by the object the speed of which is to be indicated, means actuated by the object for exerting a rotative force upon the rotatable member, and a closed spiral spring provided with a plurality of holes in the outer convolutions thereof acting on said rotatable member in opposition to said rotative force to cause the rotatable member to rotate as the speed of the object varies to cause said members to indicate the speed attained, substantially as described.

5. A speed gage, having, in combination, an indicator arranged to be rotated and to be moved along the axis of rotation and provided with a series of helically arranged graduations to indicate a given range of speeds, a fixed indicator to indicate the particular graduation corresponding to the speed attained by the object the speed of which is to be indicated, means actuated by the object for exerting a rotative force on the movable indicator, means for moving said indicator along the axis of rotation when said indicator is rotated, and a closed conical spiral spring acting on the movable indicator in opposition to said rotative force to cause the indicator to rotate and to move along the axis of rotation as the speed of the object varies to bring each graduation opposite the fixed indicator as the object attains the speed indicated by the graduation, substantially as described.

6. A speed gage, having, in combination, a casing provided with a window, a cylindrical indicator provided with a series of graduations to indicate a given range of speeds, said series extending around the cylindrical surface of the indicator a plurality of times, means actuated by the object of which the speed is to be indicated for exerting a rotative force on the indicator varying with the speed of the object the speed of which is to be indicated, and a closed spiral spring acting on the indicator in opposition to said rotative force to cause the indicator to make a plurality of revolutions as the speed of the object varies through the range for which the indicator is designed, and co-operating with said force to bring each graduation opposite said window as the object attains the speed indicated by the graduation, substantially as described.

7. A speed gage, having, in combination, a casing, indicating mechanism and operating fluid therein, a drive shaft entering the casing, a bearing sleeve for the shaft extending from the casing at a point below to a point above the level of the operating fluid, and means for forcing the fluid away from the upper end of the bearing sleeve, substantially as described.

8. A speed gage, having, in combination, a casing, indicating mechanism and operating fluid therein, a drive shaft entering the casing, a bearing sleeve for the shaft extending from the casing at a point below to a point above the level of the operating fluid, a driving sleeve surrounding the bearing sleeve and provided with a helical rib and with a bevel gear for actuating the indicating mechanism, and connections between the drive shaft and the driving sleeve, substantially as described.

9. A speed gage, having, in combination, a casing, indicating mechanism and operating fluid therein, a drive shaft entering the casing, a bearing sleeve for the shaft extending from the casing at a point below to a point above the level of the operating fluid, a driving sleeve surrounding the bearing sleeve and provided with a helical rib and with a bevel gear for actuating the indicating mechanism, and driving connections between the drive shaft and driving sleeve for rotating the latter only in one direction, substantially as described.

10. A speed gage, having, in combination, a casing, indicating mechanism and operating fluid therein, a drive shaft entering the casing, a bearing sleeve for the shaft extending from the casing at a point below to a point above the level of the operating fluid, a driving sleeve surrounding the bearing sleeve and provided at its upper end with an aperture of greater diameter than the outside diameter of the bearing sleeve and at its lower end with a gear for actuating the indicating mechanism, and connections between the drive shaft and the driving sleeve, substantially as described.

11. A speed gage, having, in combination, a casing, indicating mechanism and operating fluid therein, a drive shaft entering the casing, a bearing sleeve for the shaft extending from the casing at a point below to a point above the level of the operating fluid, a driving sleeve surrounding the bearing sleeve and carrying a gear for actuating the indicating mechanism, connections between the drive shaft and the driving sleeve and spring-pressed means for preventing the escape of fluid through the bearing sleeve, substantially as described.

12. A speed gage, having, in combination, a casing, indicating mechanism and operating fluid therein, a drive shaft entering the casing and provided with a collar at its upper end, a bearing sleeve for the shaft extending from the casing at a point below to a point above the level of the operating fluid, a driving sleeve surrounding the bearing sleeve and carrying a gear for actuating the indicating mechanism, connections between the drive shaft and the driving sleeve and a spring for holding the collar in close engagement with the top of the bearing sleeve, substantially as described.

13. A speed gage, having, in combination, a casing, indicating mechanism and operating fluid therein, a driving shaft entering the casing, a collar secured to the upper end of said shaft, a pawl carried by the collar, a bearing sleeve for the shaft extending from the casing at a point below to a point above the level of the operating fluid, a driving sleeve surrounding the bearing sleeve, a gear carried by the driving sleeve for actuating the indicating mechanism, and a shoulder on the driving sleeve arranged to be engaged by the pawl when the drive shaft is rotated in one direction only to connect the shaft to the driving sleeve, substantially as described.

14. A speed gage, having, in combination, a casing, indicating mechanism and operating fluid therein, a drive shaft entering the casing, a bearing in the casing for the shaft, and means driven by the shaft for actuating said mechanism and for acting upon the fluid to force it away from the end of the bearing to prevent the escape of fluid through the bearing, substantially as described.

15. A speed gage, having, in combination, a casing, indicating mechanism and operating fluid therein, a drive shaft entering the casing for actuating said mechanism, connections between the shaft and said mechanism, a bearing for the shaft, one end of the bearing being normally above the level of the operating fluid, and an expansion chamber between said end of the bearing and the normal level of the fluid, substantially as described.

16. A speed gage, having, in combination, a casing, indicating mechanism and operating fluid therein, a drive shaft entering the casing for actuating said mechanism, connections between the shaft and said mechanism, a bearing for the shaft, and an expansion chamber between the end of said bearing and the normal level of the operating fluid, substantially as described.

17. A speed gage, having, in combination, a casing, indicating mechanism and operating fluid therein, actuating mechanism therefor including a rotary member, the lower portion of which is below and the upper portion of which is above the normal level of the operating fluid, a bearing for said member, the contact between the member and the bearing being interrupted at a point intermediate the normal level of the operating fluid and the upper end of the member and bearing to limit the upward movement of the operating fluid between the bearing surfaces, substantially as described.

18. A speed gage, having, in combination, a casing, indicating mechanism and operating fluid therein, actuating mechanism therefor including a rotary member, a bearing for said member having its upper end above the normal level of the fluid and an expansion chamber between the normal level of the fluid and the upper end of said bearing, substantially as described.

In testimony whereof I affix my signature, in presence of two witnesses.

LOUIS A. CASGRAIN.

Witnesses:
 ALFRED H. HILDRETH,
 WARREN G. OGDEN.

Copies of this patent may be obtained for five cents each, by addressing the "Commissioner of Patents, Washington, D. C."